United States Patent [19]
Chung et al.

[11] Patent Number: 5,808,407
[45] Date of Patent: *Sep. 15, 1998

[54] USE OF ALUMINOSILICATE SOL-GEL MATERIALS AS A PHOSPHOR CARRIER IN THE FABRICATION OF FLUORESCENT LAMPS

[75] Inventors: Young Chung, Calabasas, Calif.; Thomas A. Seder, Cedar Rapids, Iowa

[73] Assignee: Rockwell International, Costa Mesa, Calif.

[*] Notice: The term of this patent shall not extend beyond the expiration date of Pat. No. 5,798,608.

[21] Appl. No.: 525,429
[22] Filed: Sep. 7, 1995
[51] Int. Cl.$^6$ .................................................. H01J 61/35
[52] U.S. Cl. ..................... 313/485; 313/489; 313/493; 313/486
[58] Field of Search ................. 313/485, 489, 313/502, 493, 486

[56] References Cited

U.S. PATENT DOCUMENTS

| | | | |
|---|---|---|---|
| 3,141,990 | 7/1964 | Ray et al. | 313/221 |
| 4,791,009 | 12/1988 | Arakawa et al. | 427/64 |
| 4,806,389 | 2/1989 | Peters et al. | 427/67 |
| 4,923,425 | 5/1990 | Ford | 445/58 |
| 4,946,707 | 8/1990 | Kasenge et al. | 427/64 |
| 4,952,422 | 8/1990 | Pappalardo et al. | 427/67 |
| 4,979,893 | 12/1990 | Pappalardo et al. | 427/67 |
| 5,126,166 | 6/1992 | Dutta et al. | 427/67 |
| 5,196,229 | 3/1993 | Chau | 427/67 |
| 5,200,233 | 4/1993 | Mohacsi | 427/67 |
| 5,464,566 | 11/1995 | Ito et al. | 252/582 |
| 5,520,855 | 5/1996 | Ito et al. | 313/479 X |
| 5,531,928 | 7/1996 | Karam et al. | 252/301.4 F |

FOREIGN PATENT DOCUMENTS

| | | |
|---|---|---|
| 44-12273 | 6/1969 | Japan . |
| 44-12274 | 6/1969 | Japan . |
| 54-124582 | 9/1979 | Japan . |
| 55-056335 | 4/1980 | Japan . |
| 55-53055 | 4/1980 | Japan . |

OTHER PUBLICATIONS

Publication by Carol Ashley & Scott Reed, in *Reed Manufacturing Technology*, pp. 5–6, dated Nov. 1992, entitled "Sol–gel Processing of Tailored Thin Films".

*Primary Examiner*—Ashok Patel
*Attorney, Agent, or Firm*—Kyle Eppele; L. Keith Stephens; James P. O'Shaughnessy

[57] ABSTRACT

An improved fluorescent lamp and a method of preparing the same are described. The fluorescent lamp includes a tube having a first surface which serves as a substrate. A continuous layer of aluminosilicate sol-gel material having phosphor particles embedded therein is formed on the first surface of the tube. The continuous layer of sol-gel material having phosphor particles embedded therein is formed by first preparing an aluminosilicate sol-gel solution. The phosphor particles are next mixed in the aluminosilicate sol-gel solution to obtain a phosphor particle carrying aluminosilicate sol-gel solution. Then, the first surface is coated with the phosphor particle carrying aluminosilicate sol-gel solution. The phosphor particle carrying aluminosilicate sol-gel solution is dried on the first surface to form a phosphor particle containing sol-gel layer.

8 Claims, 2 Drawing Sheets

USE OF ALUMINOSILICATE SOL-GEL MATERIALS AS A PHOSPHOR CARRIER IN THE FABRICATION OF FLUORESCENT LAMPS

CROSS REFERENCES TO RELATED APPLICATIONS

The following U.S. Patents and co-pending U.S. patent applications are incorporated by reference: U.S. Pat. No. 5,196,229 of Chau entitled "Coated Phosphor Articles"; co-pending and commonly assigned U.S. patent application Ser. No. 08/524,978 of Chung et al. entitled "Method of Preparing Organically Modified Aluminosilicates Sol-Gel Films"; and co-pending commonly assigned U.S. patent application Ser. No. 08/526,128 of Shaw entitled "Avionics Grade Fluorescent Lamp Resistant to Lumen Depreciation".

BACKGROUND OF THE INVENTION

The present invention is related to fluorescent lamps, and more particularly, the present invention relates to use of sol-gel films as a phosphor carrier for applying a phosphor coating to the glass of the fluorescent lamp.

In many existing fluorescent lamps, phosphor films or coatings are applied to the glass of the lamp by way of a coating process which involves rinsing the glass with a slurry composed of phosphor particles and a lacquer. The lacquer, which is typically a mixture of organic materials, is subsequently removed in a 600° C. combustion process commonly referred to as lehring. Numerous problems exist with this prior art method of applying the phosphor films to the lamp glass.

One problem with this prior art method is that the phosphor performance is degraded by the high temperatures of the lehring oven. Also, incomplete combustion of the lacquer leaves an organic residue that can dramatically diminish the performance of the lamp. Further, the phosphor particles in the resulting phosphor layer are not strongly adhered to each other or to the lamp glass. Still further, the resulting deposited phosphor coating or film will typically have a "lossy" architecture. The coating will be composed of four to five layers of somewhat spherical phosphor particles that are not in intimate contact with one another. Since the void spaces between phosphor particles have different refractive indexes, Fresnel reflections occur at the particle/void interfaces. Consequently, some visible light is directed back into the tube, where there is a high absorption loss probability.

One existing method of improving fluorescent lamp performance is disclosed in U.S. Pat. No. 5,196,229 of Chau entitled "Coated Phosphor Articles." Chau discloses a method of increasing lumen maintenance of fluorescent lamps by depositing a continuous sol-gel coating on each individual phosphor particle prior to adhering the phosphor particles to the lamp glass. This is accomplished by suspending the phosphor particles in a sol-gel solution. The sol-gel solution is then dried and broken up into a powder. The result is that individual phosphor particles have a continuous, non-particulate, conformal sol-gel coating. Presumably, the individual sol-gel coated phosphor particles are then applied to the glass of the lamp by way of the prior art lacquer coating process discussed above.

The method disclosed by Chau will presumably help to prevent degradation of phosphor performance caused by environmental conditions such as ion bombardment. However, the problem of incomplete combustion of the lacquer will likely remain. Likewise, it is doubtful that the method disclosed in Chau will adequately solve the problem of poor adhesion between the phosphor particles and the lamp glass. Finally, although individually coating phosphor particles reportedly results in increased lumen maintenance, it is likely that void spaces will still remain between the coated phosphor particles. This can result in losses due to Fresnel reflections as discussed above.

Therefore, there is a need for a fluorescent lamp which avoids or minimizes the problems of degraded phosphor performance due to high lehring temperatures, diminished performance due to incomplete lacquer combustion, poor adhesion between individual phosphor particles and between the phosphor particles and the lamp glass, and losses resulting from Fresnel reflections caused by voids between the phosphor particles.

SUMMARY OF THE INVENTION

It is an object of the present invention to provide a fluorescent lamp which exhibits minimized phosphor degradation during the process of applying the phosphor particles to the lamp glass. It is a second object of the present invention to provide a fluorescent lamp having improved performance resulting from elimination of lacquer as a phosphor carrier. It is a third object of the present invention to provide a fluorescent lamp having improved adhesion between individual phosphor particles and between the phosphor particles and the lamp glass. It is a fourth object of the present invention to provide a fluorescent lamp having improved performance due to minimization of losses resulting from Fresnel reflections. It is a fifth object of the present invention to provide a fluorescent lamp having increased lumen maintenance. The present invention achieves these and other objects discussed throughout this application.

An improved fluorescent lamp and a method of preparing the same are disclosed. The fluorescent lamp includes a tube having a first surface which serves as a substrate. A continuous layer of aluminosilicate sol-gel material having phosphor particles embedded therein is formed on the first surface of the tube. The continuous layer of sol-gel material having phosphor particles embedded therein is formed by first preparing an aluminosilicate sol-gel solution. The phosphor particles are next mixed in the aluminosilicate sol-gel solution to obtain a phosphor particle carrying aluminosilicate sol-gel solution. Then, the first surface is coated with the phosphor particle carrying aluminosilicate sol-gel solution. The phosphor particle carrying aluminosilicate sol-gel solution is dried on the first surface to form a phosphor particle containing sol-gel coating or layer.

BRIEF DESCRIPTION OF THE DRAWINGS

The invention may be more fully understood by reading the following description of preferred embodiments of the invention in conjunction with the appended drawings wherein.

DETAILED DESCRIPTION OF THE PREFERRED EMBODIMENTS

The present invention is an improved fluorescent lamp and a method of preparing the same. The method of preparing the improved fluorescent lamp includes a method of adhering phosphor particles to a surface of the fluorescent lamp by forming a continuous layer of sol-gel material, having phosphor particles embedded therein, on the surface of the lamp. Employing the sol-gel material as a phosphor carrier provides numerous advantages over the prior art. The phosphor particle containing sol-gel coating provides improved adhesion between the individual phosphor particles and between the phosphor particles and the surface of the lamp, while eliminating lacquer as a phosphor carrier. Fresnel reflections are minimized since the void spaces between the phosphor particles are filled with the index matching sol-gel material. At the same time, the sol-gel protects the phosphor particles from phosphor degradation typically caused by ion bombardment during operation of the lamp.

Figure 1:
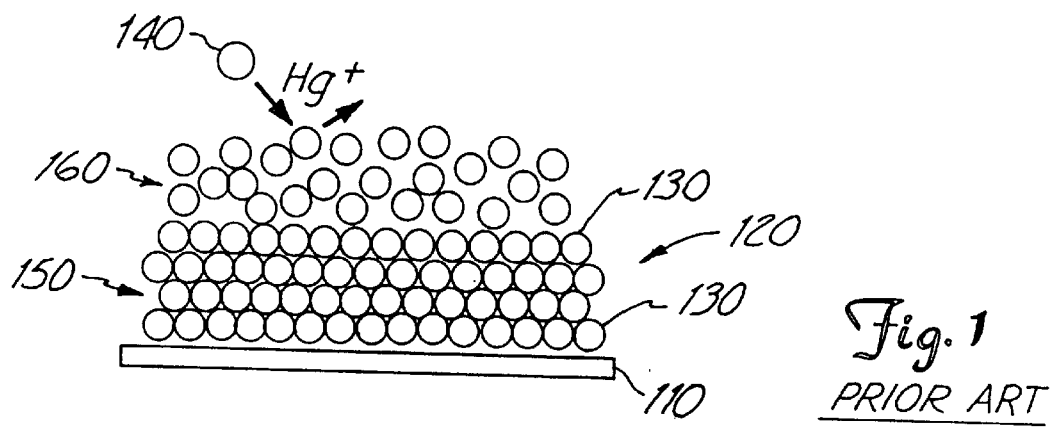
FIG. 1 a diagrammatic illustration of a portion of a prior art fluorescent lamp.

FIG. 1 is a diagrammatic illustration of a portion of a prior art fluorescent lamp. As is typical in fluorescent lamps, the prior art fluorescent lamp shown in FIG. 1 includes substrate 110 (typically an inside surface of the glass tube of the lamp) and phosphor coating or layer 120 adhered to the substrate. Excitation of a gas (e.g., such as an argon Ar and mercury Hg mixture) inside of the glass tube results in the production of UV energy. Phosphor layer 120 absorbs the UV energy and, in response, emits visible light.

FIG. 1 is used to illustrate a number of undesirable features of most prior art fluorescent lamps which the present invention overcomes. First, FIG. 1 illustrates a lumen depreciation mechanism or process caused by ion bombardment of the phosphor lattice of layer 120 during operation of the lamp. The efficacy of the phosphor in producing visible light depends upon layer 120 having a structured lattice of individual phosphor particles 130. Excitation of the gases inside of the tube of the lamp typically results in ions 140 (e.g., Hg ions) striking phosphor lattice 150. When ions 140 strike phosphor lattice 150, upper layers 160 of the lattice are disrupted, reducing the ability of layer 120 to produce visible light. Upper layers 160 of "dead" phosphor absorb some of the UV energy without producing visible light, thus reducing the efficiency of the lamp.

A second problem with many prior art lamps is that phosphor layer 120 is attached to substrate 110 using the lacquer/phosphor slurry method. Therefore, the adhesion between individual phosphor particles 130 and between phosphor particles 130 and substrate 110 is not strong. Also, incomplete combustion of the lacquer during the fabrication process of the prior art lamp is known to leave an organic residue that can dramatically diminish the performance of the lamp. Further, the void spaces left between phosphor particles 130 of layer 120 result in Fresnel reflections and a resulting loss of light output.

Figure 2:
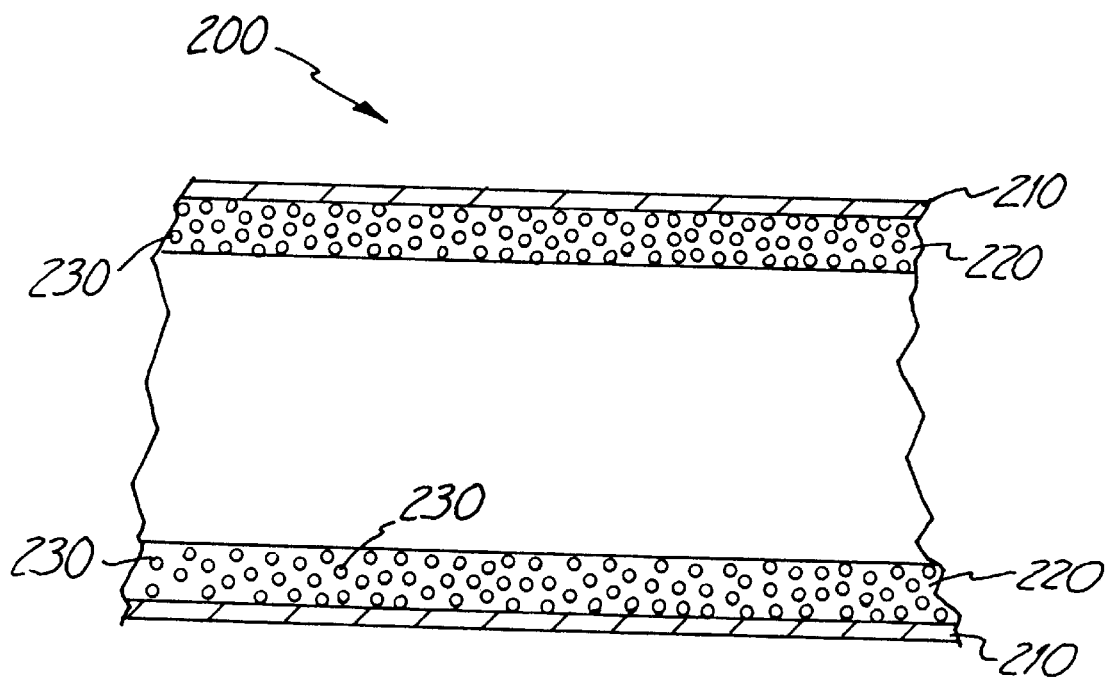
FIG. 2 is a diagrammatic side view with portions shown in section and portions broken away of a fluorescent lamp according to the present invention having a phosphor containing aluminosilicate sol-gel coating.

FIG. 2 is a diagrammatic side view with portions shown in section and portions broken away of a fluorescent lamp according to the present invention having a phosphor containing aluminosilicate sol-gel coating. Fluorescent lamp 200 includes lamp glass 210 and phosphor containing sol-gel layer or coating 220. Lamp glass 210 is preferably a glass envelope of the type known in the art having a tubular shape. In this instance, lamp glass 210 will have inner and outer glass surfaces and a gas (e.g., an Ar/Hg mixture) contained inside of the inner surface. In the embodiment shown in FIG. 2, phosphor containing sol-gel coating 220 is formed on the inner surface of lamp glass 210. However, phosphor containing sol-gel coating 220 can, in other embodiments, be formed on the outer surface of lamp glass 210.

Phosphor containing sol-gel coating 220 is preferably a continuous aluminosilicate sol-gel film or coating having individual phosphor particles 230 embedded therein. A preferred method of forming phosphor containing sol-gel coating 220 is described in detail with reference to the flow diagram of FIG. 3. In operation, gases inside of lamp 200 emit UV energy, just as in prior art fluorescent lamps. The UV energy passes through the sol-gel material of phosphor containing sol-gel coating 220. As in prior art fluorescent lamps, phosphor particles 230 absorb the UV energy and emit visible light in response.

Using the sol-gel precursor solution as a phosphor carrier eliminates the lacquer presently used as a phosphor carrier by prior art fluorescent lamps. The sol-gel coating provides strong adhesion between individual phosphor particles 230 and between the phosphor particles and lamp glass 210. Thus, lamp 200 does not suffer from poor phosphor particle adhesion as do prior art fluorescent lamps. Further, since no lacquer is used, the problem of residual lacquer adversely affecting the performance of the lamp does not exist. Since the void spaces in between phosphor particles 230 are filled with the sol-gel material, which preferably has index matching properties, Fresnel reflections are minimized and luminance is enhanced. Finally, using sol-gel as a phosphor carrier protects phosphor particles 230 from ion bombardment damage.

Figure 3:
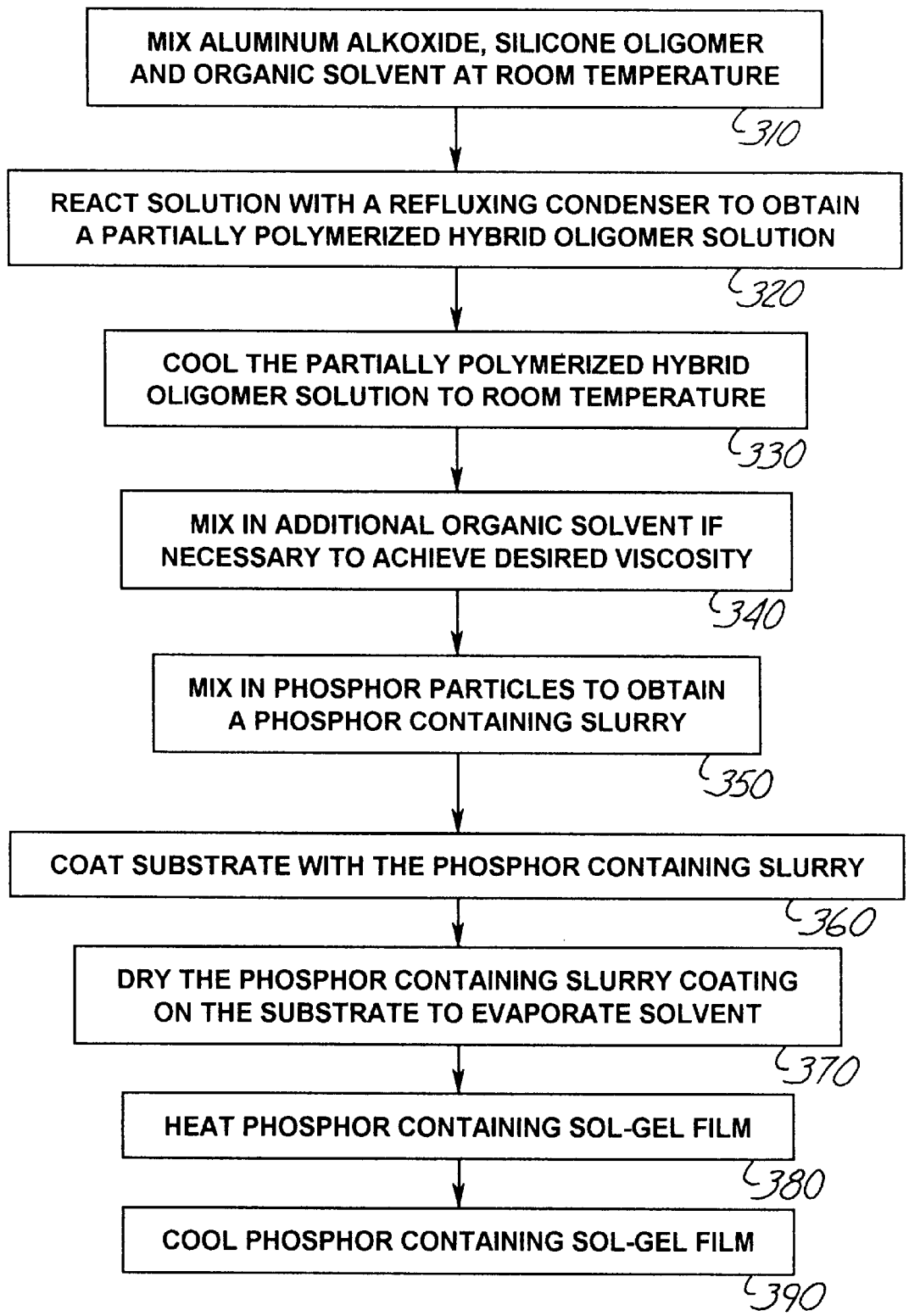
FIG. 3 is a flow diagram illustrating a preferred process for producing fluorescent lamps having a phosphor containing sol-gel coating or film.

According to preferred embodiments of the present invention, the phosphor particles of the fluorescent lamp are embedded in a sol-gel film coating on a surface of the glass tube of the lamp. In some preferred embodiments, the phosphor particles are embedded in a substantially crack-free aluminosilicate sol-gel film. Using a substantially crack free aluminosilicate sol-gel film provides improved performance of the lamp while better protecting the phosphor particles from environmental conditions such as ion bombardment damage. FIG. 3 is a flow diagram illustrating a preferred method of producing phosphor particle containing substantially crack-free aluminosilicates sol-gel films. The steps of the process are as follows:

Step 310: Mix or combine an aluminum alkoxide with a silicone oligomer. The aluminum alkoxide is preferably aluminum di (sec-butoxide) acetoacetic ester chelate (Al $(OC_4H_9)_2(C_6H_9O_3)$). The silicone oligomer is preferably silanol terminated polydimethylsiloxane $((SiO(CH_3)_2)_{22}(OH)_2)$. The aluminum di (sec-butoxide) acetoacetic ester chelate (hereinafter ALSBC) and the silanol terminated polydimethylsiloxane (hereinafter PDMS) are preferably combined in a 1 to 1 weight ratio. Alternatively stated, ALSBC and PDMS are preferably combined or mixed in a 5.8 to 1 mole ratio.

An organic solvent is added to the ALSBC\PDMS mixture. In preferred embodiments, the organic solvent is isopropanol and is mixed in a volume ratio of 1 part isopropanol to 2 parts ALSBC\PDMS mixture. The ALSBC\PDMS and organic solvent are preferably combined at room temperature.

Step 320: Mix\react the ALSBC\PDMS in the organic solvent and reflux at approximately the boiling temperature of the organic solvent to facilitate the sol-gel reaction. In preferred embodiments in which the organic solvent is isopropanol, the ALSBC\PDMS and organic solvent are mixed at approximately 80° C. (±3° C.) for about 30 minutes. The result of step 320 is a partially polymerized hybrid oligomer (e.g., an aluminosilicate sol-gel) solution. Equation 1 and 2 describe two of the many possible aluminosilicates sol-gels which may formed at this point.

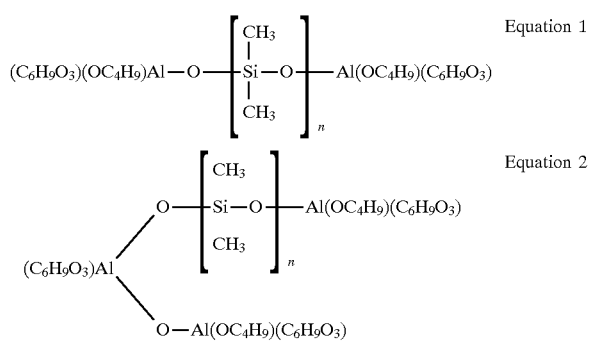

Step 330: Cool the partially polymerized hybrid oligomer solution to room temperature. The rate of cooling is not particularly important and can vary widely to accommodate a particular desired manufacturing setting or condition. The result of step 330 is a viscous liquid containing isopropanol and partially polymerized hybrid oligomer.

Step 340: If necessary, mix in additional organic solvent to the viscous hybrid oligomer mixture to reduce the viscosity of the mixture. The quantity of additional organic solvent can be varied widely depending on how much phosphor is to be added. If a large quantity of phosphor is to be added, then dilution with additional organic solvent is necessary. If relatively little phosphor is to be added, no dilution is necessary. The mixing time for step 340 is not particularly important. However, longer mix times are preferred and one hour is a typical mix time.

Step 350: Mix phosphor particles in the hybrid oligomer and organic solvent mixture to create a phosphor containing slurry including these components.

Step 360: Coat the desired substrate (i.e., the lamp glass) with the phosphor containing slurry by any conventional coating process. Preferred coating processes include spin and dip coating processes, with dip coating being preferred if the substrate is not a flat substrate. The substrate should be coated with the mixture to form a coating of the desired thickness. Phosphor containing sol-gel coatings in excess of 2.0 μm can be achieved without the coating exhibiting any significant cracking in later steps of the process.

Step 370: Dry the phosphor containing slurry on the substrate at room temperature to evaporate at least a portion of the organic solvent and to produce a substantially crack-free organically modified aluminosilicate sol-gel film on the substrate. The aluminiosilicate sol-gel film has phosphor particles embedded therein. The drying time can vary, but is typically about one hour. It is believed that the elastomeric organic groups in the aluminosilicate sol-gel aid in preventing or minimizing cracking of the film during the drying process.

Step 380: Heat the phosphor containing organically modified aluminosilicate sol-gel film to enhance polymerization and to harden the film. Remaining organics are combusted and removed while the film is sintered. In preferred embodiments, the phosphor containing organically modified aluminosilicate sol-gel film is heated to about 400° C. by increasing the temperature by about 3° C. per minute. Once 400° C. is achieved, the temperature is maintained at 400° C. for at least one hour, but preferably about 5 hours to complete polymerization and to help to evaporate residual solvents.

Step 390: Cool the phosphor containing aluminosilicate sol-gel film to room temperature. The rate of cooling is not particularly important. In preferred embodiments, the source of heat is turned off and the sol-gel film is simply allowed to cool on its own. However, the rate of cooling can be increased or decreased considerably without causing substantial cracking in the sol-gel film. The resulting phosphor containing substantially crack free aluminosilicate sol-gel film provides improved adhesion between individual phosphor particles and between the phosphor particles and the lamp glass. Further, the substantially crack free aluminosilicates sol-gel film minimizes lumen depreciation by protecting the phosphor particles from ion bombardment. Also, by filling void spaces between phosphor particles, the aluminosilicate sol-gel film minimizes Fresnel reflections.

While particular embodiments of the present invention have been shown and described, it should be clear that changes and modifications may be made to such embodiments without departing from the true scope and spirit of the invention. It is intended that the appended claims cover all such changes and modifications.

We claim:

1. A fluorescent lamp comprising:
    a tube having a first surface, the first surface serving as a substrate; and
    a continuous layer of sol-gel material formed on the first surface of the tube, the continuous layer of sol-gel material having phosphor particles embedded therein.

2. The fluorescent lamp of claim 1, wherein the continues layer of sol-gel material adheres the phosphor particles to the first surface of the tube.

3. The fluorescent lamp of claim 1, wherein the continuous layer of sol-gel material fills areas between individual phosphor particles, and wherein the sol-gel material has index matching properties to minimize Fresnel reflections.

4. The fluorescent lamp of claim 1, wherein the continuous layer of sol-gel material is a continuous layer of aluminosilicate sol-gel material.

5. The fluorescent lamp of claim 4, wherein the aluminosilicate sol-gel material includes aluminum alkoxide and a silicone oligomer.

6. The fluorescent lamp of claim 5, wherein the continuous layer of sol-gel material is a substantially crack free layer of aluminosilicate sol-gel material.

7. The fluorescent lamp of claim 6, wherein the continuous layer of sol-gel material protects the phosphor particles from ion bombardment damage during operation of the fluorescent lamp.

8. The fluorescent lamp of claim 5, wherein the aluminum alkoxide is aluminum di(sec-butoxide)acetoacetic ester chelate and wherein the silicone oligomer is silanol terminated polydimethylsiloxane.

* * * * *